Dec. 4, 1951 K. J. RIOS 2,577,209
INFRARED RELEASE OF WATER OF CRYSTALLIZATION
Filed June 10, 1948 2 SHEETS—SHEET 1
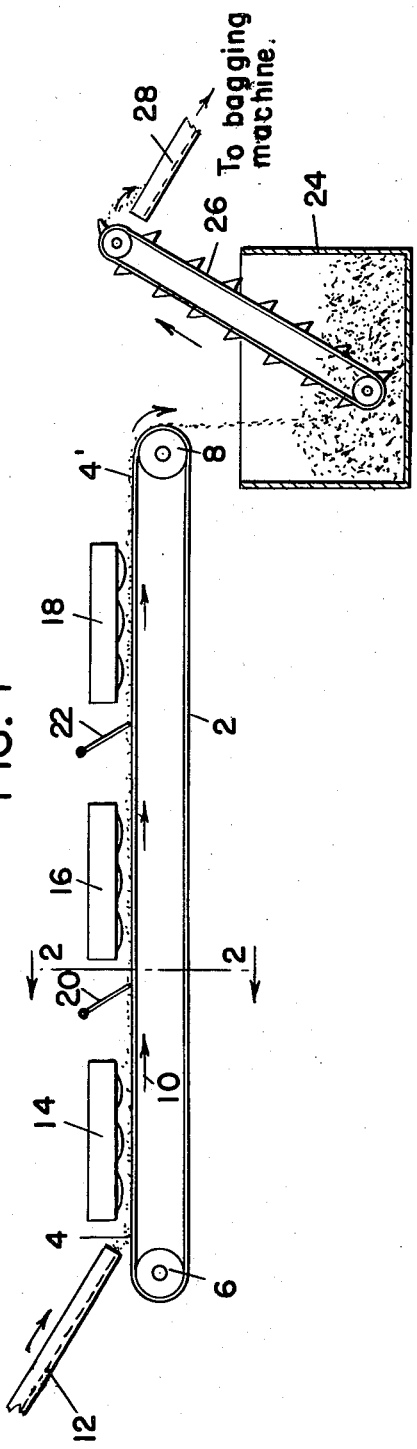
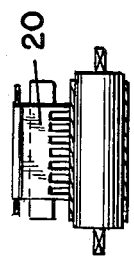
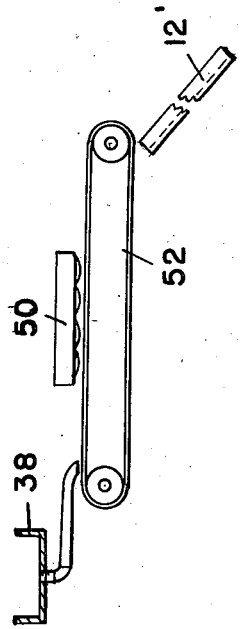
KENNETH J. RIOS, Inventor
By Norman N. Holland
Attorney Dec. 4, 1951 K. J. RIOS 2,577,209
INFRARED RELEASE OF WATER OF CRYSTALLIZATION
Filed June 10, 1948 2 SHEETS—SHEET 2
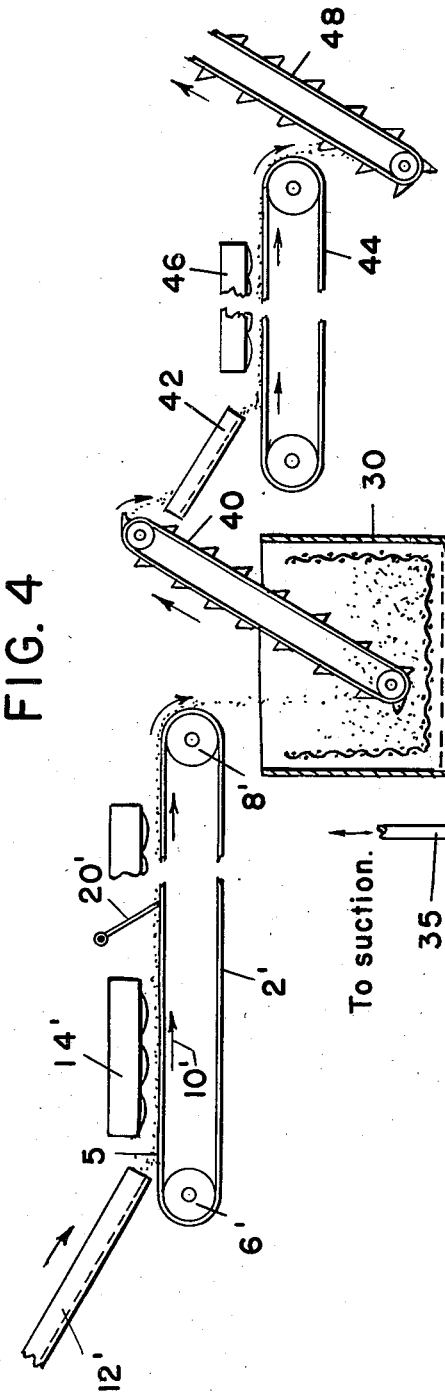
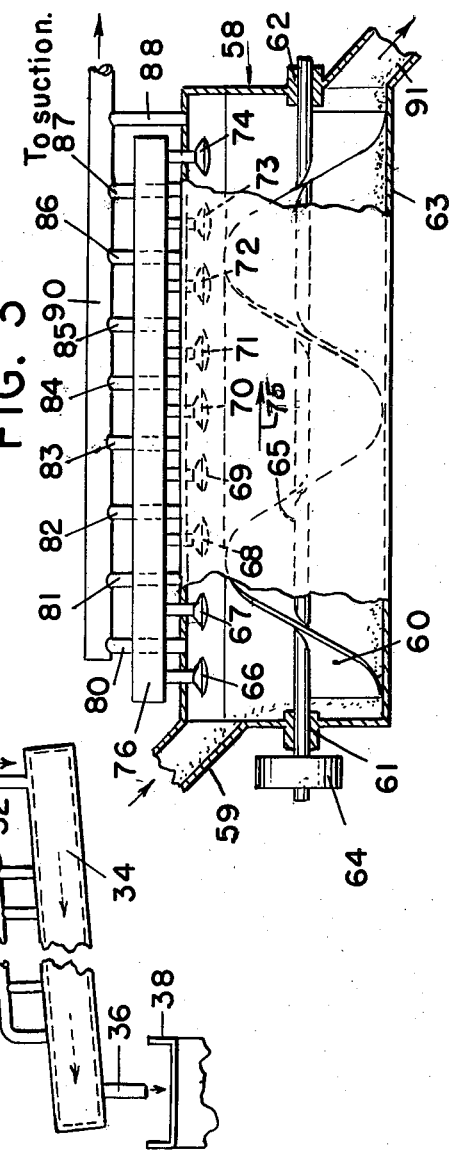
Inventor
KENNETH J. RIOS,
By Norman N. Holland
Attorney Patented Dec. 4, 1951

2,577,209

UNITED STATES PATENT OFFICE 2,577,209

INFRARED RELEASE OF WATER OF CRYSTALLIZATION

Kenneth J. Rios, Los Angeles, Calif., assignor of one-half to Bernard J. Hoffman, Jr., Los Angeles, Calif.

Application June 10, 1948, Serial No. 32,094

4 Claims. (Cl. 204—157)

The present invention relates to a method for releasing the bound water of crystallization from inorganic salts and more particularly to a method involving the use of electronics for releasing the bound water of crystallization from Glauber's salt and other inorganic salts containing water of crystallization to convert the same to the anhydrous form.

It is well known that the removal of the bound water of crystallization from Glauber's salt, or sodium sulphate decahydrate, and from other inorganic salts containing bound water of crystallization, presents serious difficulties in commercially reducing the salt to the anhydrous form. Glauber's salt, for example, contains substantially 56 per cent of water. This salt occurs or crystallizes in monoclinic crystals which melt at 32.4° C., forming sodium sulphate and a solution of the salt in the water of crystallization. The solubility curve of sodium sulphate increases from 0° C. to 32.4° C., but decreases from 32.4° C. to the boiling point of the solution, so that continued heating of a solution of sodium sulphate above 32.4° C. causes additional precipitation of solid sodium sulphate from the solution.

The methods heretofore commercially used for releasing the bound water of crystallization from Glauber's salt and other inorganic salts containing water of crystallization have included the use of costly evaporators provided with steam jackets, tube evaporators or dehydration tubes, rotary kilns, apparatus for dehydration involving the use of alternating current which is passed between the electrodes immersed in a solution of a salt, atmospheric drying in evaporating pans by the heat of the sun, and others, but such methods are excessively costly or slow and undependable or involve other serious difficulties.

As a result of the ordinary cost of evaporating Glauber's salt to form anhydrous sodium sulphate therefrom, this material which is produced as a by-product in various chemical industries is frequently disposed of by dumping or discharging the salts or solutions thereof directly into rivers or into the ocean if accessible to the plant.

It is well known that water of crystallization in an inorganic salt is combined in some manner as a part of the molecule of the salt and that the water of crystallization exerts a definite vapor tension or aqueous tension at a given temperature. This property is made use of, for example, in humidors for tobacco by the use of a salt having the desired aqueous tension which retains the tobacco at the desired degree of humidity or moisture content. This property of inorganic salts containing water of crystallization is also made use of in various other commercial applications.

The chemical combination or bond existing between the water of crystallization and the inorganic salt of which it forms a part is not fully understood. It is apparent that the molecules of the water of crystallization are united in some manner by a chemical force to the molecules of the inorganic salt, by which regular chemical compounds having definite chemical compositions are formed. As a general rule, heat is given off in the formation of a salt containing water of crystallization. In the case of the decahydrate of sodium carbonate, for example, the heat of union is 8,800 gram-calories, or 8.8 kilo-calories. As further indicating that the water of crystallization is a part of a definite chemical compound, it may be noted that the aqueous tension of a hydrate, or inorganic salt containing water of crystallization, is constant at a given temperature, showing that the force holding the water of crystallization in combination with the salt is a definite force at a given temperature. The aqueous tension of Glauber's salt at a temperature of 9° C., for example, is 5.5 mm. and as the temperature is raised, the aqueous tension increases and when the temperature is lowered the aqueous tension diminishes. It is well known that different inorganic hydrates have different aqueous tensions at the same temperature.

As further showing the existence of a definite chemical compound between an inorganic salt and its water of crystallization, it may be noted that the heat of solution of the anhydrous salt is substantially different from that of a hydrate of the same salt. The heat of solution of sodium sulphate, for example, is 5.50 kilo-calories at 18° C., while the heat of solution of the corresponding decahydrate is −18.90 kilo-cal. Correspondingly, the heat of solution of anhydrous sodium carbonate is 5.639, while the heat of solution of the monohydrate is 2.25 and that of the decahydrate is −16.15. The heat of solution of anhydrous cupric sulphate is 15.89, while that of the pentahydrate is −2.796. The heat of solution of anhydrous sodium sulphide is 15.5, while that of the pentahydrate is −6.69 and that of the nonahydrate is −16.7, the corresponding values being expressed in kilo-calories.

It may be assumed that the individual atoms which compose the molecules of a crystal are arranged in a definite order or space lattice, which is the pattern formed by the spatial distribution of atoms or radicals in the crystals. It is believed that the rows of atoms act as a diffraction grating for the very short wave length of X-rays and from the crystallogram produced, or the pattern obtained on a photographic plate, the structure of the crystal may be deduced. The action of infra-red radiations of a wave length between 7,000 to 20,000 Angstrom units upon an inorganic hydrate, as Glauber's salt, for example, causes immediate release of the salt from its water of crystallization although the manner in which this is accomplished is not definitely known. It is believed, however, that the energy of the particular range of vibrations causes a rupture of the nuclear bond or molecular grouping between the water molecules and the molecules of the salt to which they are attached. It has been found as a result of extended experiments in the use of infra-red radiations from about 7,000 to 20,000 Angstrom units applied at close range to masses of crystalline inorganic hydrates, that radiations penetrate into the interior of the crystals and release the water of crystallization substantially immediately from the salt with which it is combined and permit the separation of the water of crystallization from the anhydrous salt at a rapid rate and at a relatively low cost in comparison with other commercial methods heretofore used for the production of anhydrous inorganic salts from the corresponding hydrate.

One of the objects of the present invention is to provide a method for rapidly releasing and removing the water of crystallization from an inorganic salt containing the same to produce an anhydrous salt therefrom.

Another object of the invention is to provide a method for releasing the locked water, or water of crystallization, from an inorganic salt containing the same by subjecting the inorganic hydrate to radiations of infra-red rays having a wave length between 7,000 to 20,000 Angstrom units for a relatively short period of time to produce directly the corresponding anhydrous salt therefrom.

Another object of the invention is to provide a method for releasing water of crystallization from Glauber's salt to obtain anhydrous sodium sulphate directly therefrom by subjecting the Glauber's salt to the radiation of infra-red rays of a wave length from about 7,000 to 20,000 Angstrom units so as to rupture the bond between the water of crystallization and the sodium sulphate of the salt.

Another object of the invention is to provide a novel method for the treatment and purification of a relatively impure inorganic salt containing water of crystallization to produce therefrom the corresponding anhydrous salt in substantially pure form.

Another object of the invention is to provide a novel method of producing an anhydrous inorganic salt from the corresponding hydrate containing bound water of crystallization which may be rapidly carried out at a low unit cost of production.

With these and other objects in view, the invention comprises the various features hereinafter set forth in detail and defined in the claims annexed hereto.

The preferred method of carrying out the invention and a modification thereof are described in connection with the accompanying drawings, in which:

Fig. 1 is a view in elevation illustrating the apparatus which may be employed in carrying out the preferred method of the invention;

Fig. 2 is a sectional view taken on the section line 2—2 of Fig. 1;

Fig. 3 is a sectional view in elevation showing a modified form of conveyor in which the inorganic salt containing water of crystallization to be removed therefrom is transported by means of a closed screw conveyor in which the salt is subjected to infra-red radiation during transit therein and in which water of crystallization is evolved from the salt under reduced pressure and is removed by suction from the treatment zone;

Fig. 4 is a view in elevation illustrating more or less diagrammatically a form of apparatus which may be employed in carrying out a modification of the preferred method of the invention; and Fig. 5 is a view in elevation of a form of apparatus which may be employed in the treatment of liquor produced in the said modified method, by which the liquor or purified parts thereof may be cylically returned to the process.

Referring more in detail to the drawings, the numeral 2 designates a conveyor belt adapted to carry or transport the inorganic crystalline salt from which the water of crystallization is to be removed. The conveyor belt 2 may be driven and supported by rollers 6 and 8 in the direction indicated by the arrow 10. The inorganic salt to be treated, indicated at 4, may be fed to the conveyor belt 2 by means of a chute or feeder belt 12, by which the salt is distributed in a thin layer over the surface of the conveyor belt. Mounted above the upper surface of the conveyor belt 2 are a series of infra-red lamps or banks of infra-red lights 14, 16 and 18, which are preferably mounted on adjustable supports so that the distance of the lights from the inorganic salt on the conveyor belt may be adjusted so as to distribute the light over the salt with the desired intensity. It is to be understood that any suitable number of lights may be employed in a given installation and one or more banks of lights in a series may be employed to obtain the optimum results with a given inorganic hydrate from which the water of crystallization is to be removed. It will also be understood that the speed of travel of the conveyor belt 2 may be regulated to the desired speed depending upon the character or specific properties of the inorganic hydrate which is to be treated, but in any event, the speed of travel of the salt is so regulated with reference to the radiation of the infra-red lamps in the series that the salt will become completely anhydrous by the time that it has passed the last lamp or bank of lamps by which the salt is subjected to the infra-red radiation.

During the passage of the salt 4 on the conveyor belt 2, the salt is preferably stirred and gently agitated by means of a series of fingers or plows 20 and 22, which are of the form shown more in detail in Fig. 2 of the drawings, by which the anhydrous material 4' is reduced to a powdered or comminuted form.

From the conveyor belt 2, the anhydrous material 4' may be discharged into a container or tank 24, from which it may be conveyed by any suitable means, as by means of a bucket elevator 26, to a chute 28, for example, from which it may be passed to a bagging or sacking machine, or to a storage bin, as may be desired.

If desired, the conveyor belt 2 and the infrared lamps 14, 16 and 18 may be enclosed within a closed casing and the vapors or moisture evolved from the inorganic salt under treatment may be immediately drawn off through an eduction pipe or through an exhaust manifold pipe similar to the pipe 90 (Fig. 3) connected to a series of eduction pipes positioned above the material on the conveyor belt 2 so as to draw off the moisture or vapor from the zone of infrared radiation treatment as soon as it is liberated from the inorganic salt under treatment.

It is to be understood that in place of the conveyor belt 2, above described, any other suitable form of conveyor may be employed, such as a conveyor of the screw type, or of the link type, or of the agitator type, for example, the particular form to be selected depending on the particular inorganic hydrate to be treated and on the physical and chemical properties thereof such as the caking properties, the adhesion properties with respect to the walls of the container in which it is to be treated, the tendency to oxidize in the air, the decomposition temperature and other properties, as will be understood by those skilled in the art. Obviously, under any given conditions, the type of conveyor to be selected will be that which will best serve under the conditions to be met or that which is dictated by special properties of the material to be treated.

If the inorganic salt from which water of crystallization is to be removed is subject to oxidation by air, or to contamination by reaction with the carbon dioxide in the air, a conveyor apparatus of the screw type, as shown in Fig. 3, may be used.

This form of conveyor comprises a closed casing 63 in which a screw member 60 is mounted in journals 61 and 62 and may be rotated by means of the pulley 64 mounted on the screw shaft 65. The inorganic salt containing water of crystallization which is to be treated may be passed into the container 63 through a suitable conduit 59, which may be valved and connected to a separate chamber (not shown) to prevent access of air in feeding the material to be treated into the container.

In the passage of the salt through the container, the screw member 60 moves the salt in a rotary path in which it is subjected in relatively thin layers to infra-red radiation from a series of infra-red lamps 66, 67, 68, 69, 70, 71, 72, 73 and 74, which are suitably mounted within the container 63 adjacent the path of travel of the salt, the individual lamps being preferably supported and connected to a frame member 76 mounted outside of the container 63. The lamps are uniformly distributed along the path of the salt undergoing treatment so as to provide a treatment zone in which the source of light or infra-red radiations is stationary and the material under treatment is moved in a rotary path at a uniform speed so as to substantially immediately release the water of crystallization from the inorganic salt containing the same under the first two or three lamps in the series, the remaining lamps serving to evaporate the released water of crystallization and to convert the salt completely to the anhydrous form.

The vaporized water is preferably removed from the treatment zone by means of suction through a series of conduits 80, 81, 82, 83, 84, 85, 86, 87 and 88, which may be connected to an exhaust manifold 90, which may in turn be connected to a suitable form of suction apparatus, not shown. It will be understood that the container 63 is preferably operated under reduced pressure, or sub-atmospheric pressure, in order to remove water of crystallization from inorganic salts which are readily oxidized by contact with air, such as sodium sulphide hydrates, for example, or to remove water of crystallization from inorganic salts which are readily contaminated in air, or which undergo chemical change in contact therewith, such as to form carbonates by reaction with the carbon dioxide of the air.

After the material has passed through the apparatus in the direction of the arrow 75, and has been converted to the dry anhydrous form, the anhydrous salt may be withdrawn through the outlet conduit 91, which may be provided with suitable valves or control means and connected to a collecting chamber, not shown, by means of which reduced pressure may be maintained within the casing 63 in the manner well known in the art.

It will be understood also that the method, as described, is adapted for the removal of water of crystallization from a relatively pure salt, and particularly for the removal of water of crystallization from relatively pure sodium sulphate decahydrate (Glauber's salt), sodium sulphide monohydrate, sodium sulphide pentahydrate, sodium sulphide nonahydrate, sodium carbonate monohydrate, sodium carbonate decahydrate, sodium borate decahydrate, copper sulphate pentahydrate, and others, from which the corresponding anhydrous salt is directly obtained.

While the preferred method above described is employed in the treatment of a relatively pure salt containing water of crystallization to obtain the corresponding anhydrous salt therefrom it will be obvious to those skilled in the art that the method may be modified so as to treat various inorganic salts containing water of crystallization and substantial amounts of impurities to obtain a relatively pure anhydrous salt therefrom. A modification of the preferred method for the treatment of relatively impure salts may be described in connection with the form of apparatus illustrated in Figs. 4 and 5 of the drawings, in which the parts 2', 6', 8', 10', 12' and 14' are similar to the corresponding parts 2, 6, 8, 10, 12 and 14, above described in connection with Fig. 1 of the drawings.

Assuming that the material 5 to be treated is an impure Glauber's salt, the crystals may be passed onto the conveyor belt 2' from the feeder belt or chute 12' and passed under the infra-red lights 14', the infra-red rays having a wave length of from 7,000 to 20,000 Angstrom units, but preferably of a wave length of about 14,000 Angstrom units. The distance of the infra-red lights from the salts and the speed of the conveyor belt is so regulated that the locked water, or water of crystallization, in the salts is entirely released and passes with water of crystallization containing sodium sulphate and impurities into a filter 30 of any suitable form, by which sodium sulphate is separated from the liquid. The liquid containing sodium sulphate and impurities dissolved therein is passed through an exit pipe 32 into a conduit 34, which may be under a vacuum or reduced pressure, and the liquid may then be passed through an exit pipe 36 to a tank or container 38, in which the liquid may be chemically purified. From the filter 30, the released sodium sulphate may be passed by means of a conveyor 40 to a chute 42 and onto a second conveyor belt 44 under a bank of infra-red lights 46, similar to the infra-red lights 14', by which the sodium sulphate is rendered completely anhydrous. From the conveyor belt 44, the anhydrous sodium sulphate may be transferred to a bucket elevator 48 and from thence to a sacking bin or bagging machine.

The liquid in the tank 38, which contains small amounts of impurities, may be treated with a suitable amount of reagent to remove or precipitate any given impurity or impurities. If the sodium sulphate solution contains a small amount of sulphuric acid and iron, for example, it may be purified by adding the requisite amount of milk of lime to neutralize the sulphuric acid and then adding thereto a solution of bleaching powder, by which the iron compound is oxidized to the ferric state, and is precipitated as ferric hydroxide, which settles on standing and may be removed by decantation or by filtration. The purified liquor may then be concentrated, if desired, in any suitable manner, or it may be directly treated by means of a bank of infra-red lights 50 on a suitable form of conveyor 52 to evaporate the liquid, and the sodium sulphate therefrom may then be passed onto the conveyor belt 44 to convert the same with the sodium sulphate from the filter 30 to the dry anhydrous form.

Alternatively, the purified liquor containing sodium sulphate may be passed directly to the stock pile of Glauber's salt and recycled with the Glauber's salt under treatment. Or, if desired, the purified liquor may be given a preliminary treatment on the conveyor 52 by means of the infra-red light from the bank of lights 50 to concentrate the liquor to any desired concentration, the separated sodium sulphate being stirred or agitated on the conveyor by scrapers, fingers or plows similar to those shown in Fig. 2, in order to prevent the separated salts from adhering to the conveyor, and the material may then be passed to the chute or feeder element 12' to be recycled with the main stock of Glauber's salt.

The treatment and purification of an inorganic salt containing water of crystallization, such as sodium sulphate decahydrate, for example, may be carried out in part in the apparatus of Fig. 3, the number of lamps employed being reduced so that the water of crystallization is not completely evaporated, but a sufficient amount is retained so that when the liquid and sodium sulphate pass out of the exit conduit 91 to the filter 30, the amount of liquid will be sufficient to carry the impurities with it, and the liquid may then be purified in the manner above described and the remainder of the process may be carried out as above explained.

It is to be understood that while the method of the invention has been described in its preferred form and a modification thereof by which any inorganic salt containing water of crystallization may be treated by means of infra-red rays to obtain the anhydrous salt therefrom, various changes or modifications may be made, as will be apparent to those skilled in the art, without departing from the spirit or scope of the invention as defined by the claims annexed hereto.

Having thus described the invention, what is claimed as new is:

1. A method for dehydrating an inorganic salt containing bound water of crystallization which comprises transporting said crystals relatively distributed on a conveyor as a thin layer exposing each individual crystal directly to a source of radiation, providing treating means including initial infra red radiation of a wave length between 7000 and 20,000 Angstrom units directed against the exposed surfaces of said crystals at close range and in an amount penetrating into the interior of each exposed crystal and releasing the water of crystallization thereof and reducing the crystals to readily comminuted form within a relatively short time of exposure to said radiation, and thereafter for a relatively long period of time evaporating the released water from the said salt to convert it to the anhydrous condition.

2. A method for dehydrating an inorganic salt as set forth in claim 1 in which the salt is sodium sulphate decahydrate.

3. A method for releasing the bound water of crystallization from the crystals of an inorganic salt containing the same as set forth in claim 1 in which the salt is separated from the released water and subsequently dehydrated to dry condition.

4. A method for releasing the bound water of crystallization from the crystals of an inorganic salt containing the same as set forth in claim 1 in which the released water is separated from the salt and subsequently treated to recover the salt content thereof.

KENNETH J. RIOS.

REFERENCES CITED

The following references are of record in the file of this patent:

UNITED STATES PATENTS

| Number | Name | Date |
|---|---|---|
| 2,034,599 | Van Marle | Mar. 17, 1936 |
| 2,281,184 | Dykstra et al. | Apr. 28, 1942 |
| 2,349,300 | Olsen | May 23, 1944 |
| 2,383,763 | Block et al. | Aug. 28, 1945 |